UNITED STATES PATENT OFFICE.

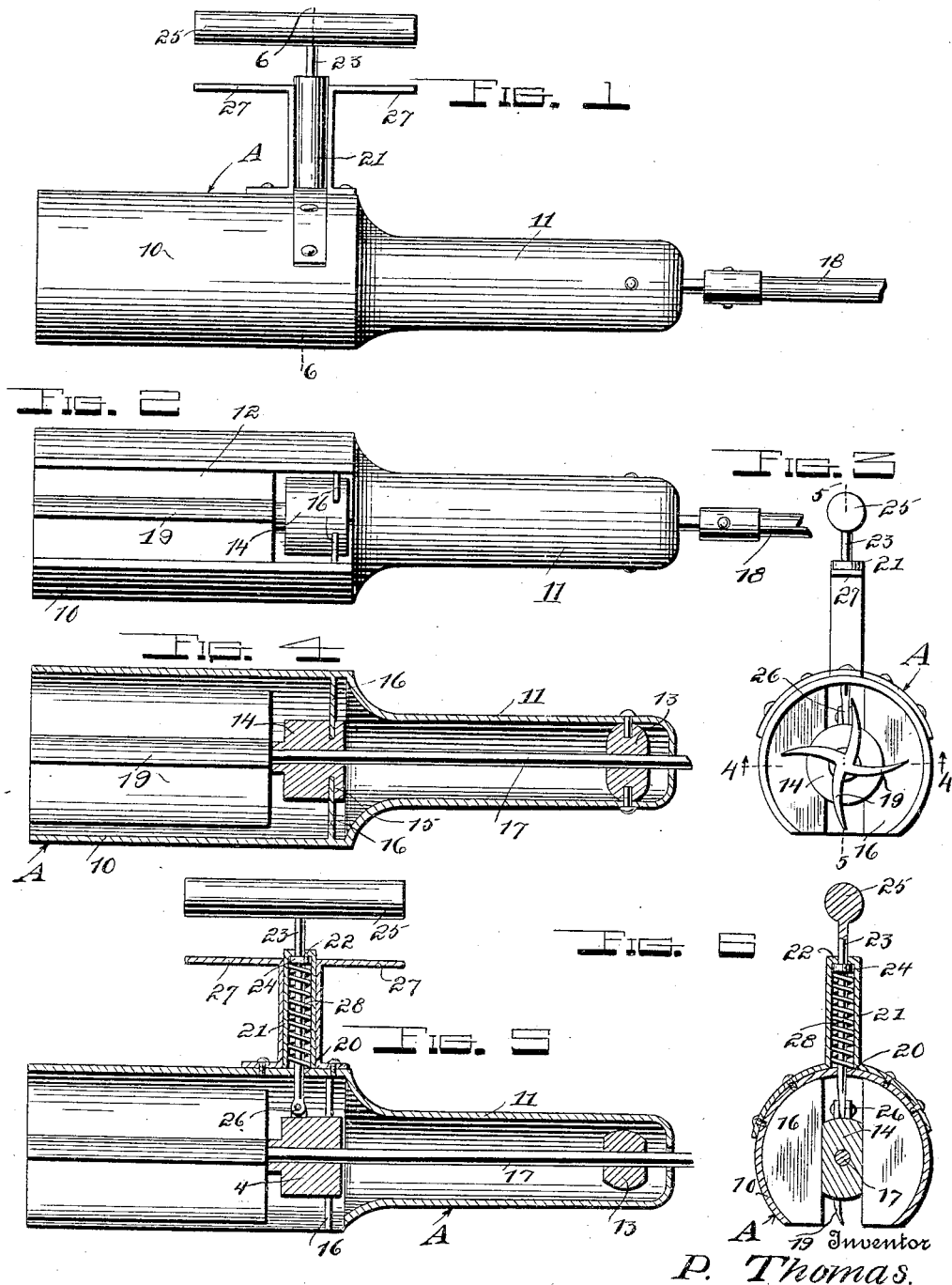

PETE THOMAS, OF ALBUQUERQUE, NEW MEXICO, ASSIGNOR OF ONE-HALF TO JULIUS MILLER, OF ALBUQUERQUE, NEW MEXICO.

HOOF-TRIMMING TOOL.

1,056,379. Specification of Letters Patent. Patented Mar. 18, 1913.

Application filed June 12, 1912. Serial No. 703,340.

*To all whom it may concern:*

Be it known that I, PETE THOMAS, a citizen of the United States, residing at Albuquerque, in the county of Bernalillo, State of New Mexico, have invented certain new and useful Improvements in Hoof-Trimming Tools; and I do hereby declare the following to be a full, clear, and exact description of the invention, such as will enable others skilled in the art to which it appertains to make and use the same.

This invention relates to hoof trimming tools.

The object of the invention resides in the provision of a power operated tool of the character referred to by means of which a hoof can be easily and quickly trimmed preparatory to placing a shoe thereon.

With the above and other objects in view, the invention consists in the details of construction and in the arrangement and combination of parts to be hereinafter more fully described and particularly pointed out in the appended claims.

In describing the invention in detail, reference will be had to the accompanying drawings wherein like characters of reference denote corresponding parts in the several views, and in which—

Figure 1 is a side elevation of a tool constructed in accordance with the invention, Fig. 2, a bottom view of the tool, Fig. 3, an outer end view of the tool, Fig. 4, a section on the line 4—4 of Fig. 3, Fig. 5, a section on the line 5—5 of Fig. 3, and Fig. 6, a section on the line 6—6 of Fig. 1.

Referring to the drawings the tool is shown as comprising a tubular casing A formed of relatively large and small portions 10 and 11 respectively. The large portion 10 is provided with an opening 12 in its side wall through which the cutting blades of the tool operate as will hereinafter appear. Pivotally mounted in the outer end of the portion 11 of the casing is a bearing 13, while another bearing 14 is disposed in the portion 10 of the casing at the inner end of the latter. This bearing 14 is provided at corresponding points in opposite sides with grooves 15 in which are engaged guide wings 16 respectively, said guide wings being suitably mounted on the inner wall of the portion 10 of the casing. It will be noted that the grooves 15 are sufficiently wide to allow ample play of the guide wings 16 so as to prevent binding and bending of the shaft 17 during movement of the bearings 14 transversely of the casing A. By this construction it will be apparent that the bearing 14 can reciprocate transversely of the casing A.

Rotatably mounted in the bearings 13 and 14 and extending longitudinally of the casing A is a shaft 17. This shaft extends through an opening in the outer end of the portion 11 of the casing and is operatively connected to a flexible shaft 18 which latter is in turn connected with a suitable source of power whereby the shaft 17 may be rotated through the instrumentality of the shaft 18. The end of the shaft 17 disposed within the portion 10 of the casing A has mounted thereon a plurality of radial cutters 19 which are adapted to operate during the rotation of the shaft 17 through the opening 12. The portion 10 of the casing A has formed in its wall adjacent the inner end of said portion an opening 20 and suitably mounted upon the outer face of the wall of the portion 10 of the casing is a hollow column 21 provided at its upper end with an inwardly directed flange 22. Slidable in the opening 20 and the column 21 is a rod 23 and formed on this rod within this column 21 is a flange 24 adapted to abut the flange 22 to limit the outward movement of the rod 23 with respect to the casing A. The outer end of the rod 23 terminates in a handle 25 while the inner end thereof is suitably connected to the bearing 14 as at 26 so that the sliding of the rod 23 will effect a movement of the bearing 14 transversely of the casing A, the pivotal mounting of the bearing 13 serving to permit such movement of the bearing 14. Suitably mounted on each side of the column 21 are finger grips 27 which are adapted to be engaged by the fingers of the hand to facilitate the operation of moving the rod 23 inwardly of the casing A. Disposed within the column 21 and encircling the rod 23 is a spring 28 one end of which bears against the outer face of the wall of the portion 10 of the casing while the other end thereof bears against the flange 24. This spring 28 constantly tends to maintain the flange 24 in engagement with the flange 22.

In the use of the tool the rotation of the shaft is instituted which will in turn effect the rotation of the shaft 17 and the cutters

19. It will be noted that the bearing 14 will be held normally at such a distance from the opening 12 by the action of the spring 28 as to position the cutters 19 at the limit of their movement inwardly of the casing A away from the opening 12 so that upon the initial rotation of the cutters 19 they will not operate through the opening 12. The tool is then applied to the hoof with the latter disposed across the opening 12. To begin the trimming operation the handle 25 is depressed with the aid of the finger grips 27 which will in turn force the rod 23 inwardly of the casing. This inward movement of the rod 23 will in turn move the bearing 14, shaft 17 and cutters 19 toward the opening 12 so that said cutters will operate through the opening 12 during their rotation and effect the trimming of the hoof. As the hoof is trimmed the depression of the handle 25 is continued until the desired quantity of hoof is removed.

What is claimed is:

1. In a hoof trimming tool the combination of a casing having an opening in its side wall, a pivoted bearing in said casing, a second bearing mounted in the casing for bodily movement transversely thereof, a shaft journaled in said bearing, cutters mounted on said shaft and adapted to operate through the opening in the casing, and means for moving the second named bearing transversely of the casing to shift the shaft and cutters toward and away from the opening in the casing.

2. In a hoof trimming tool the combination of a casing having an opening in its side wall, a pivoted bearing in said casing, a second bearing mounted in the casing for bodily movement transversely thereof, a shaft journaled in said bearings, cutters mounted on said shaft for rotation with the latter, a rod mounted for sliding movement transversely of the casing and having its inner end secured to the second named bearing, spring means constantly tending to move the outer end of said rod away from the casing, and a handle on the outer end of said rod for moving the latter inwardly of the casing against the influence of said spring means to shift the second named bearing, shaft and cutters toward the opening in the casing whereby the latter will operate during their rotation through said opening.

In testimony whereof, I affix my signature, in presence of two witnesses.

PETE THOMAS.

Witnesses:
P. DINELLI,
JUAN GONZALES.

---

Copies of this patent may be obtained for five cents each, by addressing the "Commissioner of Patents, Washington, D. C."